United States Patent [19]

Valentine et al.

[11] Patent Number: 6,011,973
[45] Date of Patent: Jan. 4, 2000

[54] METHOD AND APPARATUS FOR RESTRICTING OPERATION OF CELLULAR TELEPHONES TO WELL DELINEATED GEOGRAPHICAL AREAS

[75] Inventors: Eric Valentine, Plano; Vladimir Alperovich, Dallas, both of Tex.

[73] Assignee: Ericsson Inc., Research Triangle Park, N.C.

[21] Appl. No.: 08/759,997

[22] Filed: Dec. 5, 1996

[51] Int. Cl.[7] .................................................. H04Q 7/00
[52] U.S. Cl. .......................... 455/456; 455/457; 342/357
[58] Field of Search ................................. 455/12.1, 419, 455/550, 411, 456, 457, 825.06

[56] References Cited

U.S. PATENT DOCUMENTS

| | | | |
|---|---|---|---|
| 5,046,082 | 9/1991 | Zicker et al. | 455/419 |
| 5,235,633 | 8/1993 | Dennison et al. | 455/456 |
| 5,297,192 | 3/1994 | Gerszberg | 455/419 |
| 5,327,144 | 7/1994 | Stilp et al. | 455/456 |
| 5,432,841 | 7/1995 | Rimer | 455/457 |
| 5,442,805 | 8/1995 | Sagers et al. | 455/456 |
| 5,535,431 | 7/1996 | Grube et al. | 455/411 |
| 5,570,412 | 10/1996 | Leblanc | 455/456 |
| 5,594,425 | 1/1997 | Ladner et al. | 340/825.06 |
| 5,625,658 | 4/1997 | Loomis et al. | 455/456 |
| 5,625,668 | 4/1997 | Loomis | 455/456 |
| 5,629,707 | 5/1997 | Heuvel et al. | 455/12.1 |
| 5,726,893 | 3/1998 | Schuchman et al. | 455/456 |
| 5,742,910 | 4/1998 | Gallant et al. | 455/550 |
| 5,751,245 | 5/1998 | Janky et al. | 342/357 |

FOREIGN PATENT DOCUMENTS

| | | |
|---|---|---|
| 0 641 137 | 3/1995 | European Pat. Off. . |
| 0 505 106 A2 | 3/1992 | United Kingdom ............ 455/440 |
| 2 300 787 | 11/1996 | United Kingdom . |

OTHER PUBLICATIONS

PCT International Search Report, Apr. 8, 1998, File No. PCT US 97/21983.

Weiss, et al., "Conventional Local Area Radio Coverage System", Motorola Inc. Technical Developments, vol. 13, Jul. 1991.

*Primary Examiner*—Wellington Chin
*Assistant Examiner*—Isaak R. Jama
*Attorney, Agent, or Firm*—Jenkens & Gilchrist, P.C.

[57] ABSTRACT

The present invention provides a method and apparatus for restricting operation of a cellular telephone to well delineated geographical areas. The cellular telephone is equipped with a location device for ascertaining the current geographical location of the cellular telephone. The ascertained geographical location is compared with information pertaining to the allowability of operation of cellular telephones in various geographical locations. A determination is made as to whether the cellular telephone is allowed to operate in its current geographical location. The cellular telephone accordingly enables or disables transmitting by the transceiver of the cellular telephone.

11 Claims, 3 Drawing Sheets

METHOD AND APPARATUS FOR RESTRICTING OPERATION OF CELLULAR TELEPHONES TO WELL DELINEATED GEOGRAPHICAL AREAS

BACKGROUND OF THE INVENTION

1. Technical Field of the Invention

The present invention pertains in general to the planning and deployment of cells in a cellular telephone network, and more particularly, to restricting the operation of cellular telephones to well delineated geographical areas.

2. Description of Related Art

In the planning and deployment of a cellular telephone network, the geographical service area to be covered by the cellular telephone network is partitioned into a plurality of cells in order to facilitate frequency re-use. While in operation, a cellular telephone continually compares received signal strengths from base stations in cells adjacent to the cellular telephone. Typically, the cellular telephone establishes communication with the base station having the strongest signal. As the cellular telephone moves about the service area. Signal strengths from the base stations vary and eventually the cellular telephone reselects a new base station or, if on call, is handed-off from the current base station servicing the cellular telephone to a base station now having a stronger signal. The exact geographical location where the reselection or hand-off occurs varies with the prevailing conditions in the physical environment with respect to the propagation of radio waves. This inexact demarcation between cells creates what may be called soft-edge cells. Furthermore, since the distance from which a cellular telephone can communicate with a base station varies, the service area of a cellular telephone network cannot have an exact geographical demarcation.

In certain locations it is desirable to prohibit the operation of cellular telephones. For example, the use of cellular telephones is currently prohibited in an airplane while the airplane is preparing for take-off since transmissions from the cellular telephone can interfere with the operation of the airplane. Although cellular telephone network providers can attempt to locate cell sites away from prohibited locations such as airport runways, it is unlikely that cellular telephone service can be excluded from the geographical location of the airport runway while at the same time providing service to geographical areas adjacent to the runway due the nature of soft-edge cells. It would be advantageous therefore, to develop a method and apparatus to create hard-edge cells where the ability to operate a cellular telephone is based on the geographical coordinates where the cellular telephone is located and not on the transmission distance of radio waves.

SUMMARY OF THE INVENTION

The present invention equips a cellular telephone with a locating device for ascertaining the geographical location of the cellular telephone. In one embodiment of the present invention, the cellular telephone is further equipped with a memory containing information regarding the allowability of operation in various geographical locations. In this embodiment, the cellular telephone compares the ascertained geographical location with restricted location information contained in the memory to determine whether operation is allowed in the ascertained geographical location. Based on this determination, the cellular telephone either enables or disables operation of the cellular telephone or of a requested service or capability of the cellular telephone.

In a second embodiment of the present invention, the cellular telephone transmits its ascertained geographical location to the supporting cellular telephone network. The network accesses a database containing information regarding the allowability of operating the cellular telephone in various geographical locations and compares the transmitted ascertained geographical location with information contained in the database to determine whether the requested operation, service, or capability of the cellular telephone is authorized or prohibited in the cellular telephone's current location. The network then transmits a signal authorizing or denying cellular telephone operation based on the determination. Based on this signal, the cellular telephone either enables or disables operation.

BRIEF DESCRIPTION OF THE DRAWINGS

For a more complete understanding of the present invention, reference is made to the following Detailed Description taken in conjunction with the accompanying Drawings wherein.

DETAILED DESCRIPTION OF THE INVENTION

Figure 1:
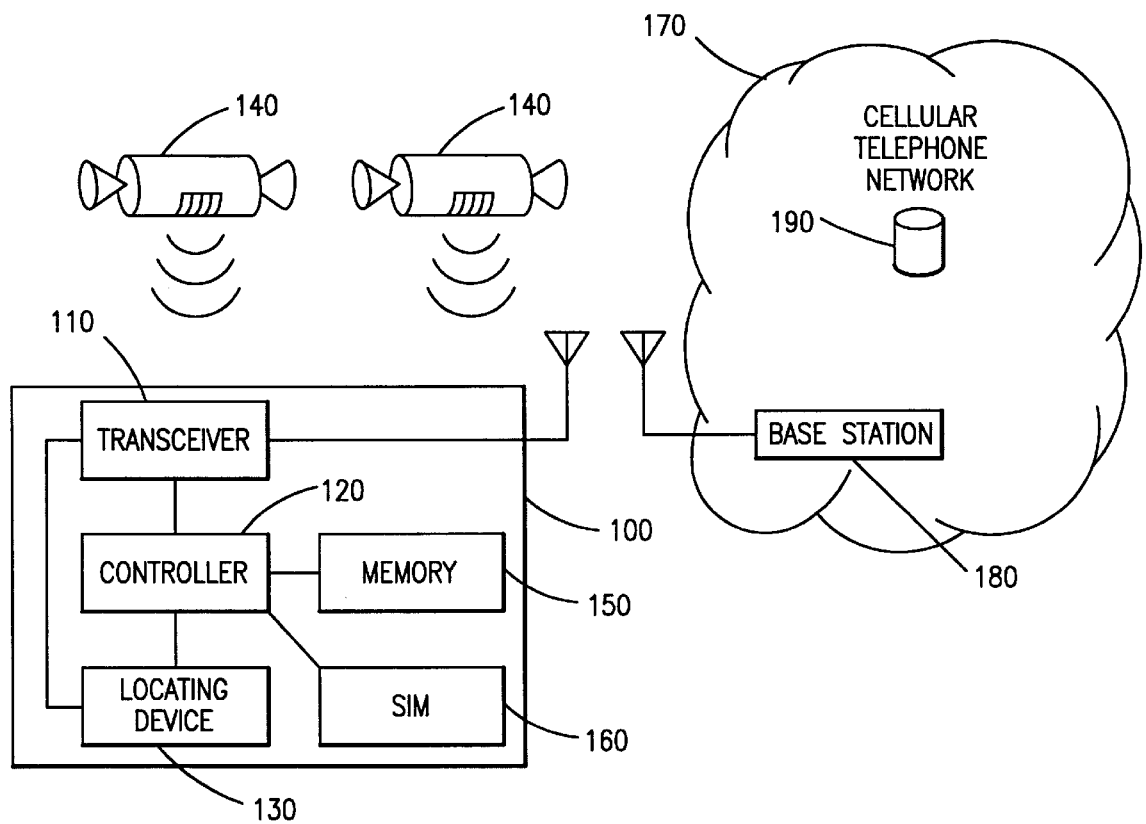
FIG. 1 is a block diagram illustrating a cellular telephone and cellular network.

Referring now to FIG. 1, there is illustrated a cellular telephone 100 including a transceiver 110, a controller 120, and a locating device 130. The locating device 130 allows the cellular telephone 100 to determine its geographical location. The geographical location can be expressed in geographical coordinates such as longitude and latitude or alternatively, the geographical location can be expressed as a distance from a fixed geographical point. An example of a locating device 130 is a Global Positioning System (GPS) which receives transmissions from satellites 140 to determine longitude and latitude coordinates. The locating device 130 communicates the ascertained geographical location to the controller 120 and transceiver 110.

In a first embodiment of the present invention, the cellular telephone 100 is equipped with a memory 150. The memory 150 can be independent or can be part of a Subscriber Identity Module (SIM) card 160 which is used in cellular telephones which conform to the Global System for Mobile Communication (GSM) standard. The memory 150, whether it is independent or part of the Subscriber Identity Module card 160, contains information regarding the allowability of operation in various geographical locations. The controller 120 compares the ascertained geographical location calculated by the locating device 130 with information contained in the memory 150 to determine whether the cellular telephone is authorized to operate in its present geographical location. If the cellular telephone is authorized to operate in its present geographical location, the controller authorizes the transceiver to transmit. Otherwise, if the controller 120 determines that the cellular telephone 100 is prohibited from operating in its present geographical location, it disables the transceiver 110 from transmitting. The information contained in the memory 150 can either be preprogrammed or it can be downloaded from a cellular telephone network 170 via a base station 180 currently servicing the cellular telephone 100. In the latter approach, the cellular telephone network 170 can periodically update the information contained in the memory 150 of cellular telephone 100 through periodic broadcasts on the broadcast channel.

In a second embodiment of the present invention, the locating device 130 determines the location of cellular telephone 100 and communicates the location to transceiver 110. The transceiver 110 transmits the ascertained geographical location of cellular telephone 100 to base station 180 in communication with the cellular telephone 100. The cellular telephone network 170 accesses a database 190 which contains information regarding the allowability of operation of cellular telephones in various geographical locations. The ascertained geographical location transmitted by cellular telephone 100 is then compared with information contained in the database 190 to determine whether the cellular telephone 100 is allowed to operate in its current geographical location. Based on this determination, the base station 180 transmits either an authorization signal allowing operation of the cellular telephone 100 or a signal denying operation of cellular telephone 100 in its current geographical location.

In addition to sending a signal denying operation of cellular telephone 100, the base station 180 must also transmit a retransmission parameter indicating when the cellular telephone 100 is allowed to transmit a new geographical location in order to receive authorization to operate in the future. The retransmission parameter can take several forms including, a period of time which must elapse before the cellular telephone can retransmit its ascertained geographical coordinates, a distance the cellular telephone must travel from its current geographical location before retransmitting a new ascertained geographical location, or a set of geographical coordinates beyond which the cellular telephone 100 must travel before retransmitting. Upon receiving the authorization or denial signal from base station 180, the controller 120 of cellular telephone 100 either enables operation of cellular telephone 100 or disables the transceiver 110 from transmitting until the retransmission parameter allowing transmitting by transceiver 110 has been met. The base station 180 may also retain the most current geographical location of cellular telephone 100 for use by the cellular telephone network 170 in providing cellular telephone service.

In either of the two embodiments described above, the base station 180 also instructs the cellular telephone 100 as to when and how often location updating is to occur. In a first approach, the base station 180 instructs the cellular telephone 100 to perform periodic location updating with the period set by the base station 180. In a second approach, the base station 180 instructs the cellular telephone 100 to perform location updating only when the cellular telephone location has changed by a distance set by the base station 180. In a third approach, the cellular telephone 100 performs location updating only at the request of the base station 180. In a fourth approach, the cellular telephone 100 performs location updating as described in the first and second approach but increases the frequency as the cellular telephone 100 approaches a restricted area.

Figure 2:
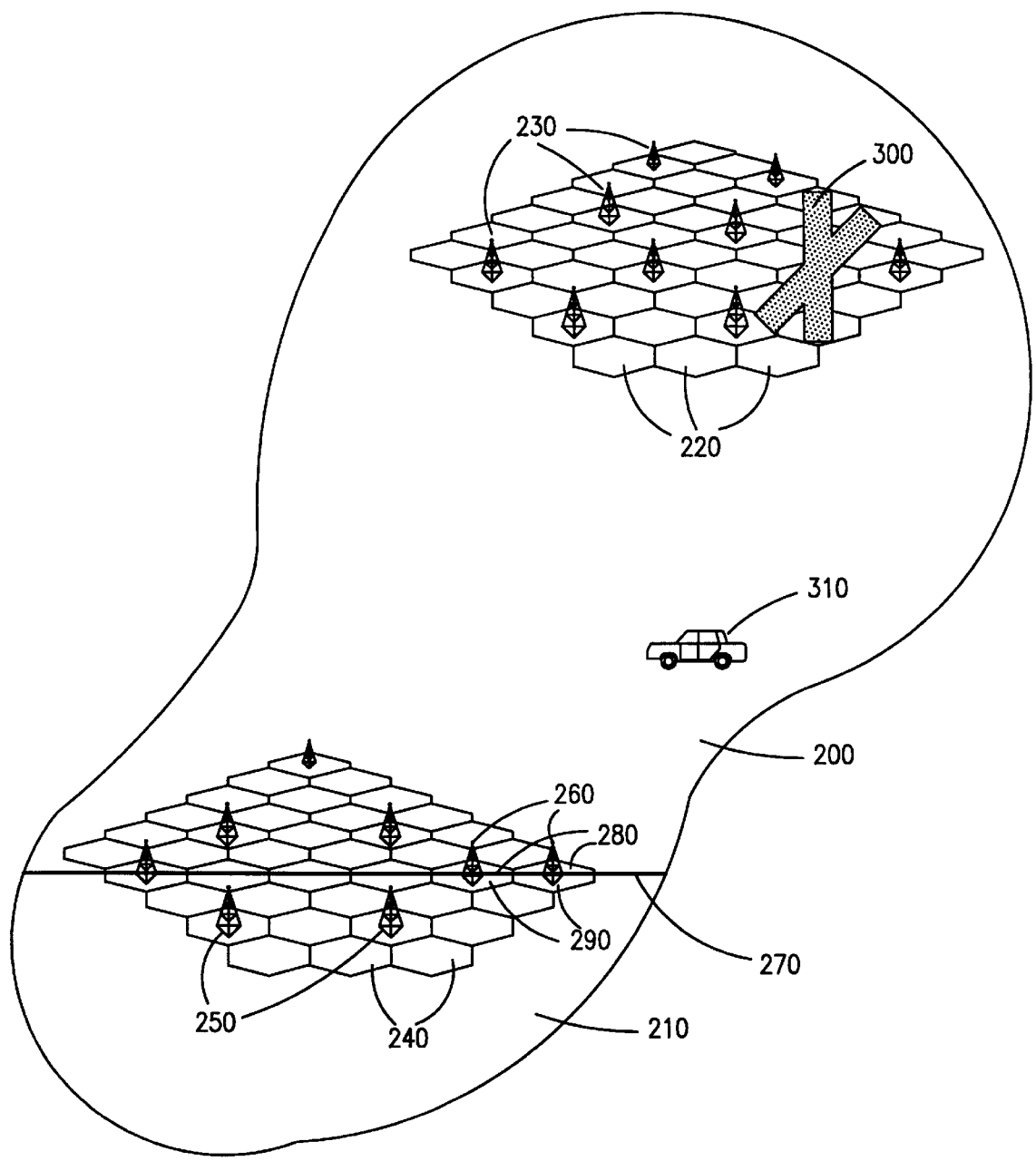
FIG. 2 depicts the geographical service area of two cellular telephone networks divided into multiple cell sites.

Referring additionally now to FIG. 2, there is illustrated a first geographical service area 200 of a first cellular telephone network and a second geographical service area 210 of a second cellular telephone network. The first geographical service area 200 includes a plurality of cells 220 serviced by a plurality of base stations 230. Likewise, the second geographical service area 210 includes a plurality of cells 240 serviced by a plurality of base stations 250. The first and second cellular telephone networks share a plurality of base stations 260 along the border 270 between the first geographical service area 200 and the second geographical service area 210. The shared base stations 260 provide cellular telephone service for the first cellular telephone network in portions of cells 280 located in the geographical service area 200 and provide cellular telephone service for the second cellular telephone network in those portions 290 of cells which lie in the geographical service area 210. Also included in FIG. 2 is a restricted geographical area 300 (e.g., airport runways) where transmissions by cellular telephones are prohibited.

As a cellular telephone 310 moves about the first geographical service area 200, the cellular telephone 310 monitors its geographical location and verifies whether operation is allowed at its ascertained geographical location using either of the two embodiments previously described. Likewise, as the cellular telephone 310 moves about the geographical service area 210, the cellular telephone 310 monitors its geographical location and verifies whether operation is allowed at its ascertained geographical location. As the cellular telephone 310 embodying the present invention approaches the border 270 between the first cellular telephone service area 200 and the second cellular telephone service area 210, the cellular telephone 310 is capable of knowing when it crosses the border 270. If the cellular telephone has subscribed to cellular telephone service from the cellular telephone service providers of both geographical service areas 200 and 210, then the cellular telephone continues to receive cellular telephone service in both geographical service areas 200 and 210. Furthermore, the subscriber is billed for cellular telephone service in each of the two geographical service areas 200 and 210, according to the actual service which was provided by each of the two cellular telephone service providers. On the other hand, if the cellular telephone 310 has subscribed to service from only one of the cellular telephone networks, then the cellular telephone 310 is prohibited from operating in that geographical service area to which the cellular telephone 310 has not subscribed. Thus, even though the cellular telephone 310 may be communicating with a base station 260 servicing both cellular telephone networks, the mobile station 310 loses cellular telephone service as it crosses the border 270 from a geographical service area to which the cellular telephone is a subscriber into a geographical service area to which the cellular telephone 310 is not a subscriber. In a similar fashion, cellular telephone 310 disables its transceiver from transmitting when entering the prohibited geographical area 300, even though cellular telephone service extends into the prohibited region 300.

Figure 3:
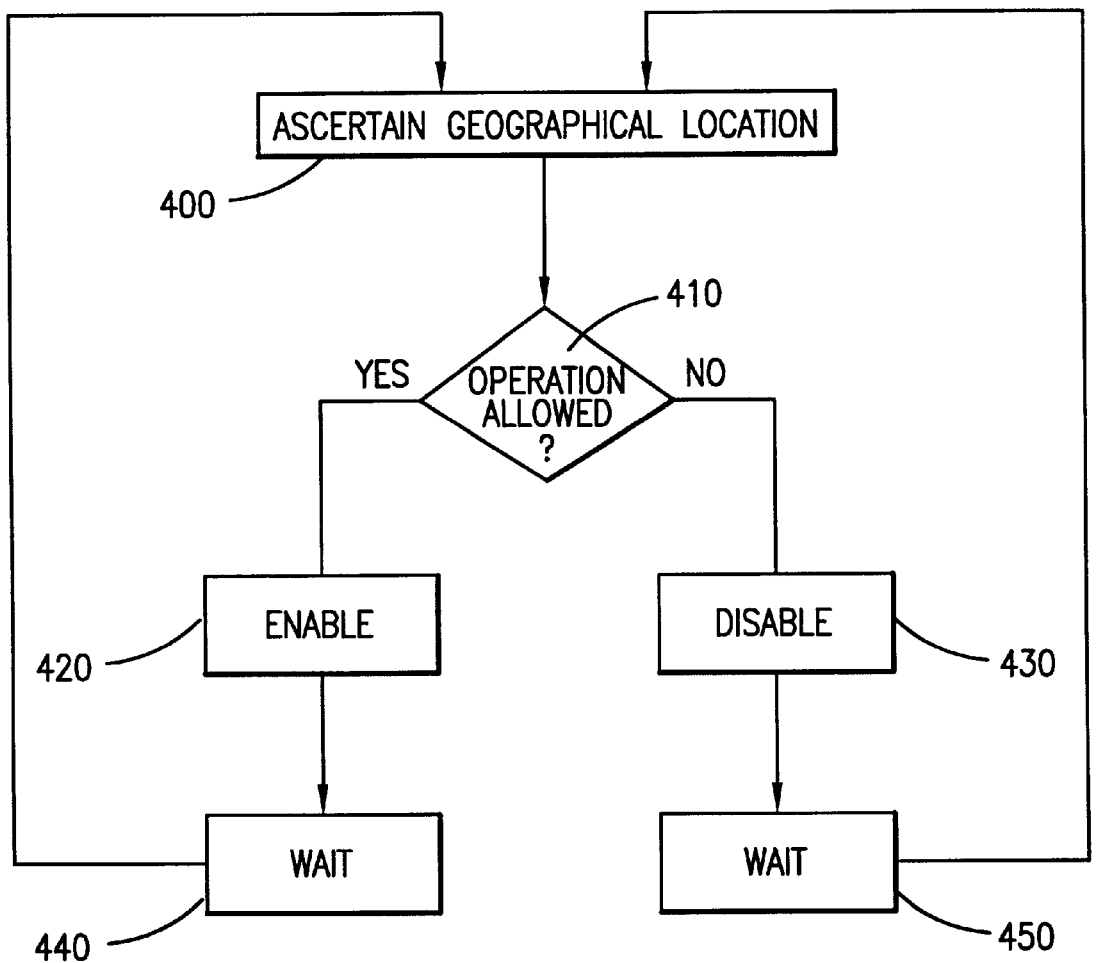
FIG. 3 is a flow diagram of a method for implementing the present invention.

Referring additionally now to FIG. 3, there is illustrated a flow diagram for implementing the present invention. During operation of cellular telephone 100, the cellular telephone periodically ascertains its current geographical location (step 400). A determination as to whether the cellular telephone 100 is allowed to operate in its current geographical location is made (step 410). In one embodiment of the present invention, this determination is made within the cellular telephone 100. In a second embodiment of the present invention, this determination is made by the cellular telephone network and, in particular, a base station 180. Once the determination has been made, following a manner consistent with either of the embodiments of the present invention, the controller 120 of cellular telephone 100 accordingly enables (step 420) or disables (step 430) transmitting by transceiver 110. If operation has been allowed, the cellular telephone 100 waits until it is time to update the geographical location (step 440) as described in the embodiments above and then returns to (step 400). If transmitting by the transceiver 110 has been disabled (step 430) the cellular telephone waits for the retransmission parameter to be met (step 450) as described in the previous embodiments and then progresses to (step 400) to ascertain its new geographical location.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A system for restricting operation of a cellular telephone based on the geographical location of the cellular telephone comprising:

in the cellular telephone:

a locating device within the cellular telephone for ascertaining the geographical location of the cellular telephone;

a transceiver for transmitting to a serving cellular telephone network the geographical location of the cellular telephone in accordance with network requests; and a controller for disabling the transceiver from transmitting in response to receiving a signal from the cellular telephone network denying operation of the cellular telephone; and in the serving cellular telephone network:

means for determining whether the cellular telephone is allowed to operate in the ascertained geographical location;

means for dynamically increasing the rate of which the serving cellular telephone network requests location updates from the cellular telephone as the ascertained geographical location of the cellular telephone approaches a restricted area; and the serving cellular telephone network further for transmitting a signal authorizing or denying operation of the cellular telephone.

2. The system recited in claim 1, wherein the locating device for ascertaining the geographical location of the cellular telephone is a Global Positioning System Receiver.

3. The system recited in claim 1, wherein the means for determining whether the cellular telephone is allowed to operate in the ascertained geographical location comprises:

a database pertaining to authorization to operate in geographical locations, the database accessible by the cellular telephone network.

4. The system recited in claim 3, wherein the cellular telephone network stores the most recent ascertained location.

5. The system recited in claim 1, wherein the serving cellular telephone network further for transmitting a parameter, with each signal denying operation, instructing the cellular telephone when to transmit the next geographical location update.

6. The system recited in claim 5, the parameter further for instructing the cellular telephone of a period of time which must elapse before the cellular telephone can retransmit its ascertained geographical coordinates.

7. The system recited in claim 5, the parameter further for instructing the cellular telephone at least one of a distance the cellular telephone must travel from its current geographical location before retransmitting a new ascertained geographical location and a set of geographical coordinates beyond which the cellular telephone must travel before retransmitting.

8. A method for restricting operation of a cellular telephone based on the geographical location of the cellular telephone comprising the steps of:

ascertaining the geographical location of the cellular telephone;

requesting the cellular telephone to transmit the ascertained geographical location to a serving cellular telephone network;

dynamically increasing the rate of requesting the ascertained geographical location of the cellular telephone as the cellular telephone approaches a restricted area;

determining whether operation of the cellular telephone is allowed in the ascertained geographical location; and enabling or disabling transmissions by the cellular telephone depending on whether operation is determined to be allowed or prohibited, respectively, in the ascertained geographical location.

9. The method recited in claim 8, wherein the step of determining whether operation is allowed further comprises comparing the ascertained geographical location to information contained in the cellular telephone pertaining to the authorization to operate in geographical locations.

10. The method recited in claim 8, wherein the step of determining whether operation is allowed comprises the steps of:

transmitting tyhe ascertained geopgraphical location to a cellular telephone; network;

comparing, by the cellular telephone network, the transmitted ascertained geographical location with information contained in the cellular telephone network pertaining to the authorization to operate in geographical locations;

transmitting a signal authorizing operation if operation is allowed in the ascertained geographical location; otherwise transmitting a signal denying operation if operation is not allowed in the ascertained geographical location; and transmitting a parameter, along with each signal denying operation, instructing the cellular telephone when to transmit the next geographical location update.

11. The method recited in claim 10, the parameter further for instructing the cellular telephone at least one of a distance the cellular telephone must travel from its current geographical location before retransmitting a new ascertained geographical location and a set of geographical coordinates beyond which the cellular telephone must travel before retransmitting and a period of time which must elapse before the cellular telephone can retransmit its ascertained geographical coordinates.

* * * * *